United States Patent
Jung et al.

(10) Patent No.: US 8,445,109 B2
(45) Date of Patent: May 21, 2013

(54) BIODEGRADABLE POLYURETHANE PLASTIC USING PHOSPHORUS PENTOXIDE

(75) Inventors: Jinwoong Jung, Yangsan-si (KR);
Seunghun Cha, Yangsan-si (KR);
Chungseob Lee, Yangsan-si (KR)

(73) Assignee: DongAh Chemical Co., Ltd., Yangsan-si (KR)

( * ) Notice: Subject to any disclaimer, the term of this patent is extended or adjusted under 35 U.S.C. 154(b) by 0 days.

(21) Appl. No.: 13/397,944

(22) Filed: Feb. 16, 2012

(65) Prior Publication Data

US 2012/0213987 A1 Aug. 23, 2012

(30) Foreign Application Priority Data

Feb. 17, 2011 (KR) .................. 10-2011-0014018

(51) Int. Cl.
*B32B 27/40* (2006.01)
(52) U.S. Cl.
USPC ........................... 428/423.1; 428/323
(58) Field of Classification Search
USPC ............................. 428/423.1, 323
See application file for complete search history.

(56) References Cited

U.S. PATENT DOCUMENTS

| 3,386,944 | A  | * | 6/1968  | Blomeyer | 524/706 |
| 3,625,917 | A  | * | 12/1971 | Ashby    | 528/36  |
| 6,372,876 | B1 | * | 4/2002  | Kim et al. | 528/71 |
| 2004/0084791 | A1 | * | 5/2004 | Han et al. | 264/4.32 |

FOREIGN PATENT DOCUMENTS

| KR | 10-0346998 B1 | 7/2002 |
| KR | 10-0644998 B1 | 11/2006 |

* cited by examiner

*Primary Examiner* — Thao T. Tran
(74) *Attorney, Agent, or Firm* — Jefferson IP Law, LLP

(57) ABSTRACT

A biodegradable polyurethane plastic is provided. The biodegradable polyurethane plastic includes biodegradable polyurethane impregnated with a phosphorus-containing additive, wherein the additive includes phosphorus pentoxide (P2O5), and the additive is coated with natural oil. The biodegradable polyurethane plastic has excellent physical properties, and can be effectively decomposed in a short period of time because it includes biodegradable polyurethane impregnated with a phosphorus-containing additive. Further, the biodegradable polyurethane plastic can be easily decomposed biologically by synthesizing polyurethane containing phosphorus pentoxide having strong oxidizing action, can be manufactured by directly adding an additive coated with natural oil to the synthesis of polyurethane, can prevent the reaction caused by moisture because it does not come into contact with air, and can prevent a color change.

12 Claims, 4 Drawing Sheets

BIODEGRADABLE POLYURETHANE PLASTIC USING PHOSPHORUS PENTOXIDE

PRIORITY

This application claims the benefit under 35 U.S.C. §119(a) of a Korean patent application filed on Feb. 17, 2011 in the Korean Intellectual Property Office and assigned Serial No. 10-2011-0014018, the entire disclosure of which is hereby incorporated by reference.

BACKGROUND OF THE INVENTION

1. Field of the Invention

The present invention relates to a biodegradable polyurethane plastic. More particularly, the present invention relates to a biodegradable polyurethane plastic including phosphorus pentoxide, in which the polyurethane is decomposed biologically by phosphorus pentoxide.

2. Description of the Related Art

It is known that plastics, which have become necessities of modern life due to their convenience, barely decompose in a state of nature and even if they do so it takes several hundred years. In recent years, sea pollution attributable to plastics discharged into the sea, the disposal of plastic waste stemming from the increase in the amount of plastic waste, and the like have become environmental issues. For this reason, degradable plastics have lately attracted considerable attention as an alternative to their disposal. Currently, degradable plastics largely include two kinds of degradable plastics which are photodegradable plastics that are decomposed by light (chiefly ultraviolet) and biodegradable plastics that are decomposed by microbes.

Biodegradable plastics are classified into plastics (biological plastics) produced by microbes, plastics made of natural materials such as starch, cellulose and the like, and chemical synthetic plastics imparted with degradability. When these biodegradable plastics are buried in the ground or discharged into the sea, they are decomposed into low-molecular compounds by microbes existing in nature, such as bacteria, algae, molds and the like, and are then converted into water and carbon dioxide gas or water and methane gas. However, conventional biodegradable plastics are problematic in that they cannot be easily molded, and their molded products have poor physical properties, thus decreasing practicality.

Meanwhile, generally, polyurethane, which is a general term for polymer compounds having a urethane bond (—NH-COO—) in a repeating unit of a main chain thereof, has excellent resistance to aging and stability to oxygen as well as high resistance to chemicals and solvents. Therefore, polyurethane is generally used in the form of polyurethane foam, polyurethane rubber, adhesives, synthetic fibers, paint or the like, and may be used to manufacture plastics. Generally, polyurethane itself has decomposition characteristics such as hydrolyzability, biodegradability and the like. However, polyurethane is problematic in that, since its deposition characteristics are very weak, when polyurethane products are used and then discarded, they are partially decomposed, not completely decomposed, so that they semi-permanently exist or it takes a long period of time for them to completely decompose, thereby causing environment pollution. For this reason, a method of recycling polyurethane products and a method of incinerating polyurethane products are being practically used. However, the method of incinerating polyurethane products is problematic in that harmful materials are generated, and the method of recycling polyurethane products is problematic in that it is difficult to collect waste polyurethane products, and even after they are collected, impurities must be removed from the waste polyurethane products. Therefore, it has been increasingly required to develop polyurethane which can be rapidly decomposed and whose properties do not change. According to this requirement, research into manufacturing polyurethane having excellent degradability has been conducted in various manners. However, in spite of such research, conventional biodegradable polyurethane is problematic in that it decomposes slowly and its properties are rapidly deteriorated at room temperature.

Therefore, a need exists for a system and method for performing a self diagnosis of a device without the inconvenience caused when manually selecting a self diagnosis item from a computer or a user interface.

SUMMARY OF THE INVENTION

Aspects of the present invention are to address the above-mentioned problems and/or disadvantages and to provide at least the advantages described below. Accordingly, an aspect of the present invention is to provide a biodegradable polyurethane plastic using phosphorus pentoxide, which has excellent physical properties, and which can effectively decompose in a short period of time because it includes biodegradable polyurethane impregnated with a phosphorus-containing additive.

Another aspect of the present invention is to provide a biodegradable polyurethane plastic using phosphorus pentoxide, which can be easily decomposed biologically by synthesizing polyurethane containing phosphorus pentoxide having strong oxidizing action, which can be manufactured by directly adding an additive coated with natural oil to the synthesis of polyurethane, which can prevent reactions caused by moisture because it does not come into contact with air, and which can prevent a color change.

In accordance with an aspect of the present invention, a biodegradable polyurethane plastic is provided. The biodegradable polyurethane plastic includes biodegradable polyurethane impregnated with a phosphorus-containing additive, wherein the additive includes phosphorus pentoxide ($P_2O_5$).

Here, the additive may be coated with natural oil.

Further, the additive may be included in an amount of 0.4~0.6 wt % with respect to the biodegradable polyurethane.

Further, the additive may further include potassium hydroxide (KOH).

Further, the biodegradable polyurethane may be prepared by mixing a polyurethane resin with a one-component type urethane impregnated with the additive.

Further, the biodegradable polyurethane may be included in an amount of 30~60 wt % based on the total amount of the biodegradable polyurethane plastic.

Further, the biodegradable polyurethane plastic may include: 35~45 wt % of the biodegradable polyurethane; 25~35 wt % of polylactic acid; and 25~35 wt % of aliphatic polyester.

Further, the biodegradable polyurethane plastic may include: 45~55 wt % of the biodegradable polyurethane; 35~45 wt % of polylactic acid; and 5~15 wt % of aliphatic polyester.

Furthermore, the biodegradable polyurethane plastic may be made in the form of a film.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
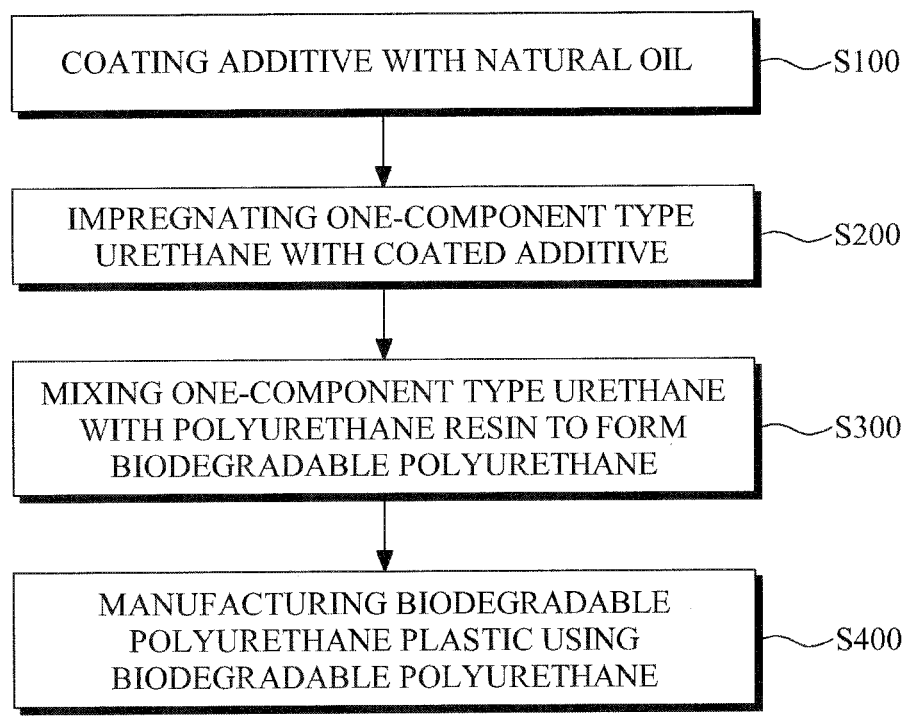
FIG. 1 is a flowchart showing a method of manufacturing a biodegradable polyurethane plastic using an additive according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, throughout the description, the term "connected" means not only that one element is directly connected to another element but also that one element is indirectly connected to another element with a further element being interposed therebetween. Also, the term "comprises or includes" and/or "comprising or including" used herein shall be construed as indicating inclusion of one or more other elements rather than limitation unless stated otherwise.

The biodegradable polyurethane plastic according to an embodiment of the present invention includes biodegradable polyurethane impregnated with a phosphorus-containing additive, and the additive may include phosphorus pentoxide ($P_2O_5$). Phosphorus pentoxide, which is an anhydride of phosphoric acid, is white crystalline powder produced when phosphorus is burned by air or oxygen, and is used as a strong oxidizing agent. Phosphorus pentoxide may be used as a drying agent or a dehydrating agent because it has very strong hygroscopicity and its ability to absorb moisture in air is very excellent compared to sulfuric acid or calcium chloride. Phosphorus pentoxide, which is a strong oxidizing agent, serves to decompose polyurethane.

The additive may be coated with natural oil. As described above, since phosphorus pentoxide included in the additive acts as a strong oxidizing agent, the additive is coated with natural oil to provide an antioxidative effect. In particular, since the present invention relates to a biodegradable polyurethane plastic using phosphorus pentoxide, it is preferred that natural oil be used because it is environmentally friendly, decomposes together with the polyurethane and is harmless to environment. Meanwhile, the additive may further include calcium hydroxide (KOH). When the additive further includes calcium hydroxide, polyurethane can be efficiently decomposed in a short period of time.

The additive may be included in an amount of 0.4~0.6 wt % with respect to the biodegradable polyurethane. When the amount of the additive is more than 0.6 wt %, polyurethane is excessively rapidly decomposed, thus shortening the life cycle of the biodegradable polyurethane plastic. Further, when the amount of the additive is less than 0.4 wt %, polyurethane cannot be effectively decomposed. Therefore, it is preferred that the additive be included in an amount of 0.4~0.6 wt % with respect to the biodegradable polyurethane.

Meanwhile, the biodegradable polyurethane may be included in an amount of 30~60 wt % based on the total amount of the biodegradable polyurethane plastic. The biodegradable polyurethane plastic according to an embodiment of the present invention may include only the biodegradable polyurethane. However, in order to manufacture a plastic having various physical properties and improve price competitiveness, the biodegradable polyurethane may be mixed with a conventional biodegradable plastic resin. In this case, the amount of the biodegradable polyurethane is adjusted to 30~60 wt % based on the total amount of the biodegradable polyurethane plastic, thus maintaining excellent biodegradability and physical properties.

Particularly, the biodegradable polyurethane plastic according to an embodiment of the present invention may be manufactured by mixing polylactic acid (PLA) and aliphatic polyester, each of which is a conventional plastic resin, with the biodegradable polyurethane of the present invention. Polylactic acid, although it is a biodegradable plastic resin, is problematic in that, when it is actually used, it is difficult to mold a plastic, it takes a long time to mold the plastic, and the physical properties of a final plastic product are not good. Further, aliphatic polyester, although it is used as a disposable material because it can be completely biodegraded, is problematic in that, since it has low thermal deformation temperature and insufficient heat resistance, it is inconvenient to transport and use a final plastic product, and it is difficult to sterilize the final plastic product. Therefore, the biodegradable polyurethane plastic is manufactured by mixing polylactic acid (PLA) and aliphatic polyester with the biodegradable polyurethane of the present invention, thus overcoming the problems of a conventional biodegradable resin, increasing practical utility and improving price competitiveness. Specifically, the biodegradable polyurethane plastic of the present invention may include: 35~45 wt % of the biodegradable polyurethane; 25~35 wt % of polylactic acid; and 25~35 wt % of aliphatic polyester. In this mixing ratio, it is possible to manufacture a biodegradable polyurethane plastic having high practical utility and improved price competitiveness.

Meanwhile, in order to manufacture a biodegradable polyurethane plastic having various physical properties, the biodegradable polyurethane plastic of the present invention may include: 45~55 wt % of the biodegradable polyurethane; 35~45 wt % of polylactic acid; and 5~15 wt % of aliphatic polyester.

Meanwhile, the biodegradable polyurethane plastic according to an embodiment of the present invention may be made in the form of a film. Since various types of plastic products that must be biodegradable are film-type plastic products, such as specific refuse envelopes, vinyl bags, etc., the biodegradable polyurethane plastic of the present invention is made in the form of a film, thus enlarging its practical utility.

FIG. 1 is a flowchart showing a method of manufacturing a biodegradable polyurethane plastic using phosphorus pentoxide as an additive according to an exemplary embodiment of the present invention.

As shown in FIG. 1, the method of manufacturing a biodegradable polyurethane plastic using phosphorus pentoxide as an additive according to an embodiment of the present invention includes the steps of: coating an additive with natural oil (S100); impregnating one-component type urethane with the additive coated with the natural oil (S200); mixing the one-component type urethane with a polyurethane resin to form biodegradable polyurethane (S300); and manufacturing a biodegradable polyurethane plastic using the biodegradable polyurethane (S400).

In step S100, an additive containing phosphorus pentoxide may be coated with natural oil. Since phosphorus pentoxide is an acid oxide having strong hygroscopicity, it must be stored in a sealed acid-resistant container. Therefore, it is very difficult to directly add the additive containing phosphorus pentoxide to polyurethane. For this reason, the additive is coated with natural oil to prevent the surface of the additive from coming into contact with the outside, thus blocking the influence of moisture and preventing oxidization.

In step S200, the additive coated with natural oil, which was prepared in step S100, may be impregnated into a one-component type urethane. Phosphorus pentoxide can be used as an agent for biologically decomposing polyurethane. However, since phosphorus pentoxide causes an oxidation reaction together with moisture, it is difficult to directly add it to polyurethane independently, and thus it could not be used. However, since the additive coated with natural oil is mixed with a liquid one-component type urethane having high dispersibility as in step S200, the oxidation attributable to the additive can be prevented. The additive is mixed with the liquid one-component type urethane, and then the one-component type urethane impregnated with the additive can be prepared using a curing agent.

In step S300, the one-component type urethane impregnated with the additive, which was prepared in step S200, is pulverized, and is then mixed with a polyurethane resin to prepare biodegradable polyurethane. In this case, the additive may be included in an amount of 0.4~0.6 wt %, preferably, 0.5 wt % with respect to the prepared biodegradable polyurethane. When the amount of the additive is less than 0.4 wt %, polyurethane is not sufficiently biodegraded. Further, when the amount thereof is more than 0.6 wt %, polyurethane is excessively biodegraded, and thus the life cycle of a plastic product becomes short, so it is uneconomical.

Meanwhile, the polyurethane resin, which is mixed with the one-component type urethane used in step S200, may be a polyurethane resin including a polyol having various molecular weights. Particularly, the polyurethane resin may be a polyurethane resin including a polyol having a molecular weight of 1000~6000. In this case, isocyanate, particularly, methylene diphenyl diisocyanate (MDI) may be used in a molar ratio of 1~1.5.

The polyurethane composition used in the present invention will be described in detail as follows. The polyurethane composition includes, based on 100 parts by weight of the composition: 10~15 parts by weight of isocyanate; 88.7~90 parts by weight of polyester polyol; 1~3 parts by weight of glycol; and 0.3~0.5 parts by weight of wax. Here, isocyanate may be selected from the group consisting of naphthalene-1,5-diisocyanate, 2,4-tolylenediisocyanate, 2,6-tolylenediisocyanate, hexamethylene diisocyanate, isoprene diisocyanate, and mixtures thereof. It is preferred that the amount of the isocyanate be 1~1.5 mol. When the amount of isocyanate is more than 1.5 mol, there is a problem in that biodegradability is low. Further, when the amount of isocyanate is less than 1 mol, there is a problem in that reactivity is low, so the melting point becomes low in the synthesis of urethane, thereby deteriorating workability.

Polyester polyol may be one or more selected from the group consisting of adipic acid, succinic acid, phthalic acid, isophthalic acid, and phthalic anhydride. Glycol may be one or more selected from the group consisting of ethyleneglycol, 1,4-butanediol, 1,6-hexanediol, 1,8-octanediol, diethyleneglycol, and propyleneglycol. In this case, it is preferred that synthetic polyester polyol of suitable molecular weight and physical properties be used, and, particularly, in order to adjust a molecular weight, it is more preferred that adipic acid and 1,4-butanediol be used.

Glycols serve to adjust the hardness of polyurethane, and, preferably, may be selected from 1,4-butanediol, ethyleneglycol, diethyleneglycol, and mixtures thereof. Wax serves as a lubricant, and may be H-wax.

For example, when a polyol having a molecular weight of 1000~3000 reacts with MDI, a polyurethane resin having mechanical properties of a low hardness of 70 (hardness A), a working temperature of 185° C., a tensile strength of 300 kg/cm2 and an elongation of 700% can be obtained. Further, when a polyol having a molecular weight of 3000~6000 reacts with MDI, a polyurethane resin having mechanical properties of a low hardness of 75 (hardness A), a working temperature of 190° C., a tensile strength of 350 kg/cm2 and an elongation of 600% can be obtained. That is, in order to manufacture a biodegradable film and a plastic having various physical properties, in step S300, polyol resins having physical properties suitable for purposes can be used.

In step S400, the biodegradable polyurethane, which was prepared in step S300, is mixed with a conventional biodegradable plastic resin to manufacture the biodegradable polyurethane plastic according to an embodiment of the present invention. Although this biodegradable polyurethane plastic can be manufactured using 100 wt % of the biodegradable polyurethane prepared in step S300, in order to realize various physical properties and improve price competitiveness, it may manufactured by mixing this biodegradable polyurethane with the conventional biodegradable plastic resin. In this case, the conventional biodegradable plastic resin may be polylactic acid or aliphatic polyester.

Hereinafter, the present invention will be described in more detail with referenced to the following Examples. However, these Examples are set forth to understand the present invention more clearly, and the scope of the present invention is not limited thereto.

An additive containing phosphorus pentoxide was coated with natural oil, and then the additive coated with natural oil was impregnated into liquid one-component type urethane to prepare one-component type urethane using a curing agent.

Meanwhile, even when the additive further includes potassium hydroxide (KOH) (Example 5), in a manner similar to the case of the additive including only phosphorus pentoxide, powdered potassium hydroxide was coated with natural oil, and then the potassium hydroxide coated with natural oil was impregnated into liquid one-component type urethane together with the phosphorus pentoxide coated with natural oil to prepare a one-component type urethane using a curing agent. Subsequently, the prepared one-component type urethane was pulverized, and was then mixed with a general polyurethane resin such that the ratio of the additive to the polyurethane resin is given as in Table 1 below. Finally, the resulting product was extruded in the form of a film to manufacture biodegradable polyurethane plastic films of Examples 1 to 5. The physical properties of the manufactured biodegradable polyurethane plastic films were measured based on the JIS K7311, and the results thereof are given in Table 1 below.

TABLE 1

| Class. | | Example 1 | Example 2 | Example 3 | Example 4 | Example 5 |
|---|---|---|---|---|---|---|
| Ratio of additive (wt %) | $P_2O_5$ | 0.5 | 1 | 3 | 5 | 0.5 |
| | KOH | 0 | 0 | 0 | 0 | 0.5 |
| Density (kg/cm3) | | 1.17 | 1.18 | 1.20 | 1.22 | 1.23 |
| Modulus (kg/cm2) | | 34 | 50 | 68 | 71 | 73 |
| Elongation (%) | | 785 | 760 | 630 | 605 | 595 |
| Tensile strength (kg/cm2) | | 370 | 410 | 470 | 485 | 490 |
| Tear strength (kg/cm) | | 78 | 102 | 122 | 145 | 175 |

Referring to Table 1, it can be ascertained that the physical properties of the biodegradable polyurethane plastic manufactured using the additive according to the present invention are not greatly deteriorated by the addition of the additive, and thus this biodegradable polyurethane plastic can be widely used in various fields.

Hereinafter, the effects of the present invention will be described in more detail with reference to the following Experimental Examples. However, the scope of the present invention is not limited these Experimental Examples.

Biodegradation experiment of biodegradable polyurethane plastic films by the burial of the films in soil The biodegradable polyurethane plastic films manufactured in Examples 1 to 5 were buried in soil, and then the degree of biodegradation of the films was analyzed by photography and physical properties measurement.

Figure 2:
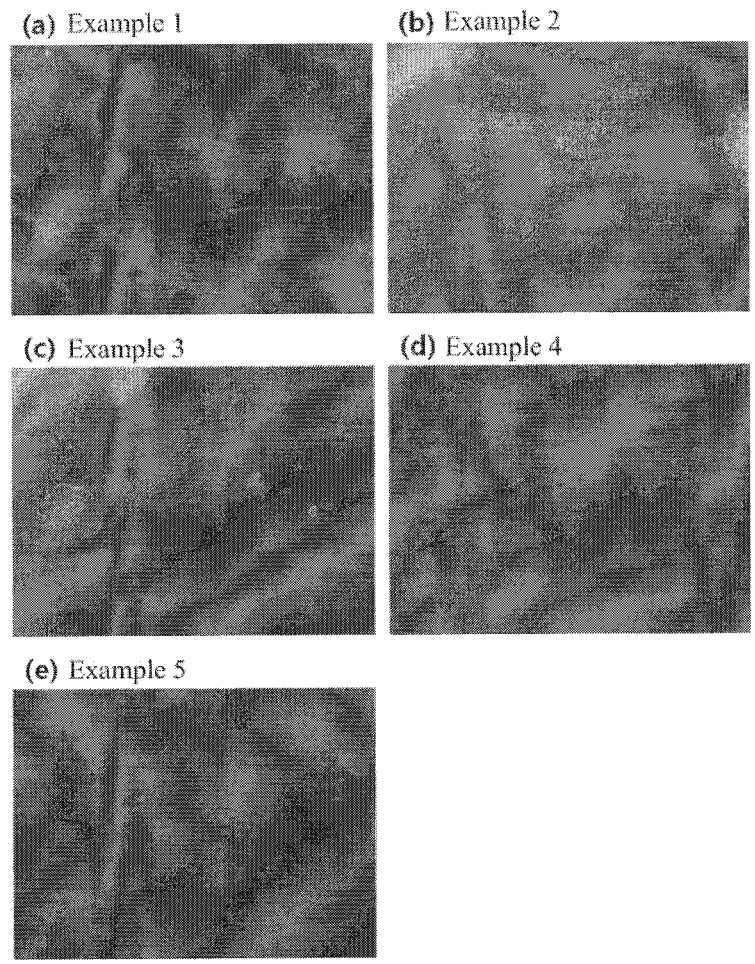
FIG. 2 is a view showing the state of a biodegradable polyurethane plastic using an additive, which has been buried in soil for one week, according to an exemplary embodiment of the present invention.
Figure 3:
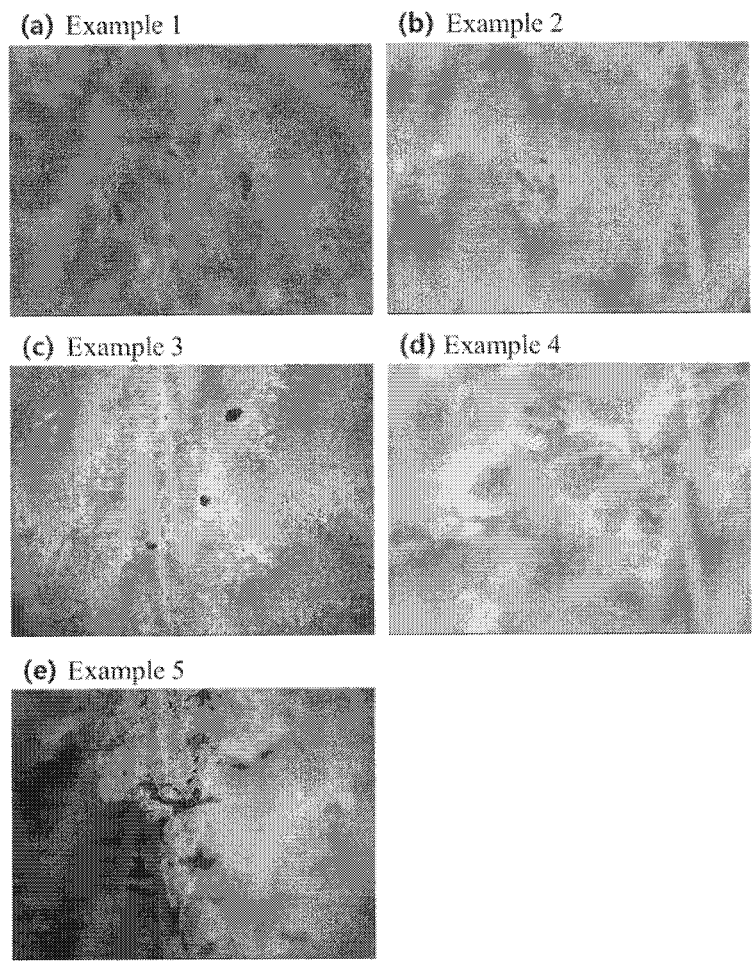
FIG. 3 is a view showing the state of a biodegradable polyurethane plastic using an additive, which has been buried in soil for three weeks, according to an exemplary embodiment of the present invention.
Figure 4:
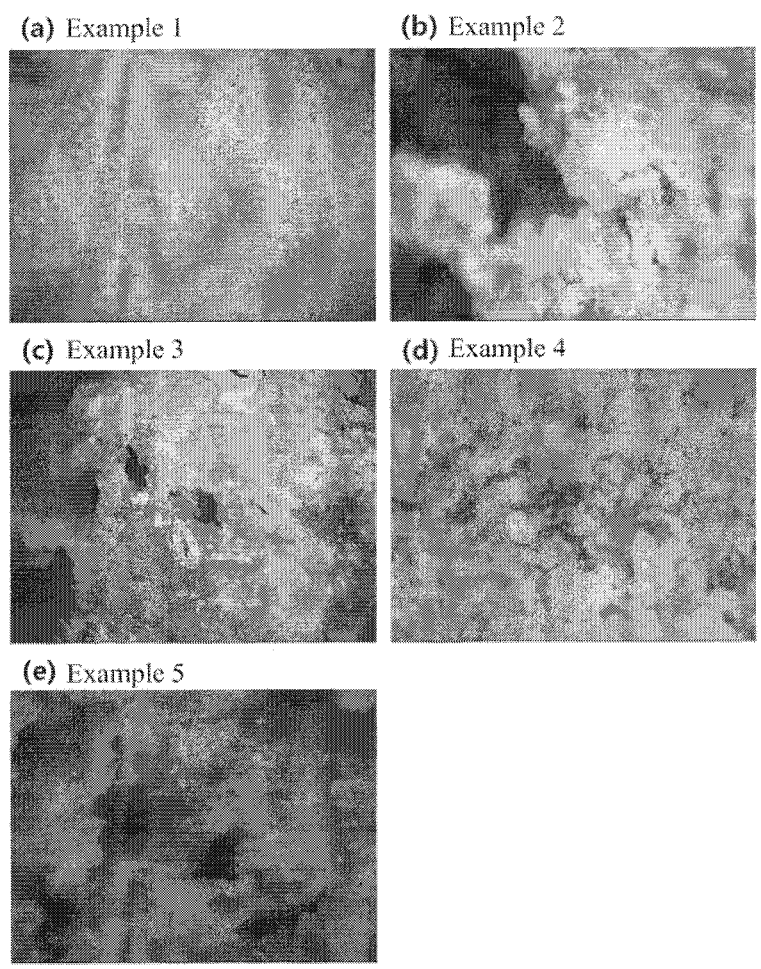
FIG. 4 is a view showing the state of a biodegradable polyurethane plastic using an additive, which has been buried in soil for five weeks, according to an exemplary embodiment of the present invention.

FIG. 2 is a view showing the state of the biodegradable polyurethane plastic films, which have been buried in soil for one week according to an exemplary embodiment of the present invention; FIG. 3 is a view showing the state of the biodegradable polyurethane plastic films, which have been buried in soil for three weeks according to an exemplary embodiment of the present invention; and FIG. 4 is a view showing the state of the biodegradable polyurethane plastic films according to an exemplary embodiment of the present invention, which have been buried in soil for five weeks. (a) to (e) of FIGS. 2 to 4 show the states of the biodegradable polyurethane plastic films of Examples 1 to 5, respectively. As shown in FIGS. 2 to 4, as time advances, each of the biodegradable polyurethane plastic films of Examples 1 to 5 became thin, was formed therein with holes, and was decomposed into very small portions, so it can be ascertained that these biodegradable polyurethane plastic films were effectively decomposed by microbes. In particular, in the case of Example 4 in which the ratio of an additive is high and in the case of Example 5 in which an additive further includes potassium hydroxide, a large hole was formed in the biodegradable polyurethane plastic films of Examples 4 and 5, and were decomposed and made smaller, so it can be ascertained that the biodegradable polyurethane plastic films of Examples 4 and 5 were biodegraded more actively. From these experimental results, it can be ascertained that the biodegradable polyurethane plastic of the present invention is environmentally friendly because it is effectively biodegraded when it is buried in soil.

Table 2 below shows the physical properties of samples which have been buried in soil for three weeks. The physical properties of samples, which have been buried for four weeks or more, could not be measured because they were remarkably deteriorated. Therefore, the physical properties of samples, which have been buried in soil for three weeks, are given in Table 2 below.

TABLE 2

| Class. | Example 1 | Example 2 | Example 3 | Example 4 | Example 5 |
|---|---|---|---|---|---|
| Elongation (%) | 350 | 320 | 270 | 290 | 250 |
| Tensile strength (kg/cm2) | 150 | 170 | 180 | 185 | 145 |
| Tear strength (kg/cm) | 30 | 40 | 35 | 35 | 30 |

As shown in Table 2 above, it can be ascertained that the biodegradable polyurethane plastic film of the present invention is actively biodegraded after being buried in soil because its physical properties thereof, such as elongation, tensile strength, tear strength and the like, were remarkably deteriorated compared to Table 1.

As described above, the biodegradable polyurethane plastic according to the present invention has excellent physical properties, and can be effectively decomposed in a short period of time because it includes biodegradable polyurethane impregnated with a phosphorus-containing additive.

Further, the biodegradable polyurethane plastic according to the present invention can be easily decomposed biologically by synthesizing polyurethane containing phosphorus pentoxide having strong oxidizing action, can be manufactured by directly adding an additive coated with natural oil to the synthesis of polyurethane, can prevent the reaction caused by moisture because it does not come into contact with air, and can prevent a color change.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A biodegradable polyurethane plastic comprising:
   biodegradable polyurethane impregnated with a phosphorus-containing additive,
   wherein the additive includes phosphorus pentoxide ($P_2O_5$), and the additive is coated with natural oil, and
   wherein the additive is included in an amount of 0.4~0.6 wt % with respect to the biodegradable polyurethane.

2. The biodegradable polyurethane plastic according to claim 1, wherein the additive further includes potassium hydroxide (KOH).

3. The biodegradable polyurethane plastic according to claim 1, wherein the biodegradable polyurethane is prepared by mixing a polyurethane resin with a one-component type urethane impregnated with the additive.

4. The biodegradable polyurethane plastic according to claim 1, wherein the biodegradable polyurethane is included in an amount of 30~60 wt % based on a total amount of the biodegradable polyurethane plastic.

5. The biodegradable polyurethane plastic according to claim 4, wherein the biodegradable polyurethane is included in an amount of 35~45 wt % based on a total amount of the biodegradable polyurethane plastic, and further comprising 25~35 wt % of polylactic acid; and 25~35 wt % of aliphatic polyester.

6. The biodegradable polyurethane plastic according to claim 4, wherein the biodegradable polyurethane is included in an amount of 45~55 wt % based on a total amount of the biodegradable polyurethane plastic, and further comprising 35~45 wt % of polylactic acid; and 5~15 wt % of aliphatic polyester.

7. The biodegradable polyurethane plastic according to claim 1, wherein the biodegradable polyurethane plastic is made in the form of a film.

8. The biodegradable polyurethane plastic according to claim 2, wherein the biodegradable polyurethane plastic is made in the form of a film.

9. The biodegradable polyurethane plastic according to claim 3, wherein the biodegradable polyurethane plastic is made in the form of a film.

10. The biodegradable polyurethane plastic according to claim 4, wherein the biodegradable polyurethane plastic is made in the form of a film.

11. The biodegradable polyurethane plastic according to claim 5, wherein the biodegradable polyurethane plastic is made in the form of a film.

12. The biodegradable polyurethane plastic according to claim 6, wherein the biodegradable polyurethane plastic is made in the form of a film.

* * * * *